United States Patent
Daniels et al.

(10) Patent No.: US 6,944,769 B1
(45) Date of Patent: Sep. 13, 2005

(54) APPARATUS AND A METHOD FOR SECURITY AUTHORIZATION USING A SECURITY KEY INSTALLED ON REMOVABLE MEDIA

(75) Inventors: Scott Leonard Daniels, Cedar Park, TX (US); Danny Marvin Neal, Round Rock, TX (US); Yat Hung Ng, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 09/637,320

(22) Filed: Aug. 10, 2000

(51) Int. Cl.[7] .............................................. G06F 12/14
(52) U.S. Cl. ..................... 713/188; 713/193; 713/200; 380/277; 711/163; 235/380; 705/51; 705/57
(58) Field of Search ............................. 713/200, 193, 713/188, 201, 167, 194; 380/277; 711/163; 235/380; 705/51, 57

(56) References Cited

U.S. PATENT DOCUMENTS

| | | | |
|---|---|---|---|
| 5,451,757 A * | 9/1995 | Heath, Jr. ................. | 340/5.4 |
| 5,602,918 A * | 2/1997 | Chen et al. ................ | 713/153 |
| 5,892,211 A * | 4/1999 | Davis et al. ............... | 235/380 |
| 5,991,401 A | 11/1999 | Daniels et al. .............. | 380/9 |
| 6,615,192 B1 * | 9/2003 | Tagawa et al. ............. | 705/57 |
| 6,681,195 B1 * | 1/2004 | Poland et al. .............. | 702/142 |
| 6,711,553 B1 * | 3/2004 | Deng et al. ................. | 705/57 |
| 2001/0044886 A1 * | 11/2001 | Cassagnol et al. ......... | 711/163 |
| 2002/0101998 A1 * | 8/2002 | Wong et al. ................ | 380/286 |

* cited by examiner

*Primary Examiner*—Ayaz Sheikh
*Assistant Examiner*—Carl G. Colin
(74) *Attorney, Agent, or Firm*—Duke W. Yee; Mark E. McBurney; Lisa L. B. Yociss

(57) ABSTRACT

An apparatus and a method in a data processing system are provided for insuring the security of data accessed from removable media. Normal virus scanning occurs after data is loaded into the main memory, but infection by a virus may have already occurred by this time. Therefore, it would be beneficial to check for possible virus infection before the data is transferred to main memory. A security key is read from the removable media. As encrypted data is read from the device, it is decrypted using the security key and then re-encrypted using the same security key to produce new data. The original data is accepted and sent to main memory if it is identical to the new data produced by decryption and re-encryption. If the two sets of data are not identical, then the data transmission from the device is aborted and all data on the removable media is rejected. The decryption/re-encryption checking is performed in hardware and so it can occur in real time. This hardware could be on the device controller, a separate security card, the mother board, or anywhere along the data path from the device controller to the main memory.

18 Claims, 3 Drawing Sheets

APPARATUS AND A METHOD FOR SECURITY AUTHORIZATION USING A SECURITY KEY INSTALLED ON REMOVABLE MEDIA

BACKGROUND OF THE INVENTION

1. Technical Field

The present invention relates generally to an improved computer security and in particular to an apparatus and a method to improve security on removable media. Still more particularly, the present invention provides an apparatus and a method for using a security key to check for virus infection for data stored on removable media before the data is transferred to the computer memory.

2. Description of the Related Art

Protection of a computer system from virus infection is vitally important for the integrity of computing. One common source of infection is removable media, such as floppy disks, ZIP disks, tape drives, or removable hard drives. Now that it is possible to "hot swap" hard drives, it is becoming more common for a user to take his applications and data with him for use on a remote computer system. Unfortunately, this is a common means by which a virus can be transferred from one computer system to another computer system. Infection can occur the other direction too with the remote machine infecting the removable media that then transfers the infection back to the home machine.

Virus detection software can scan the data once it arrives in memory, but that may be too late to prevent infection. U.S. Pat. No. 5,991,401, entitled "Method and System for Checking Security of Data Received by a Computer System within a Network Environment," describes a method to check for data infection before sending the data to memory. It is assumed a security key is known at the time the data arrives. In U.S. Pat. No. 5,991,401, there is hardware on a network interface card that decrypts the incoming data and then re-encrypts the decrypted data to produce a new set of data. If this new set of data does not match the original data, then the data is rejected as possibly being infected. If the two sets of data match, then the packet is passed on to the computer memory.

There are a variety of data encryption techniques that may be used to secure data transfers. Data Encryption Standard (DES) is based on use of a symmetric private key with the level of security varying according to key length, typical lengths ranging from 56-bit DES to 256-bit DES.

The technique outlined above works for network data with hardware built onto the network interface card. However, it provides no help for data stored on removable media. Therefore, it would be advantageous to have an apparatus and a method that allows for checking data on removable media for possible virus infection before this data is transferred to the computer memory.

SUMMARY OF THE INVENTION

An apparatus and a method in a data processing system are provided for insuring the security of data accessed from removable media. Normal virus scanning occurs after data is loaded into the main memory, but infection by a virus may have already occurred by this time. Therefore, it would be beneficial to check for possible virus infection before the data is transferred to main memory.

A security key is read from the removable media. As encrypted data is read from the device, it is decrypted using the security key and then re-encrypted using the same security key to produce new data. The original data is accepted and sent to main memory if it is identical to the new data produced by decryption and re-encryption. If the two sets of data are not identical, then the data transmission from the device is aborted and all data on the removable media is rejected.

The decryption/re-encryption checking is performed in hardware and so it can occur in real time. This hardware could be on the device controller, a separate security card, the mother board, or anywhere along the data path from the device controller to the main memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
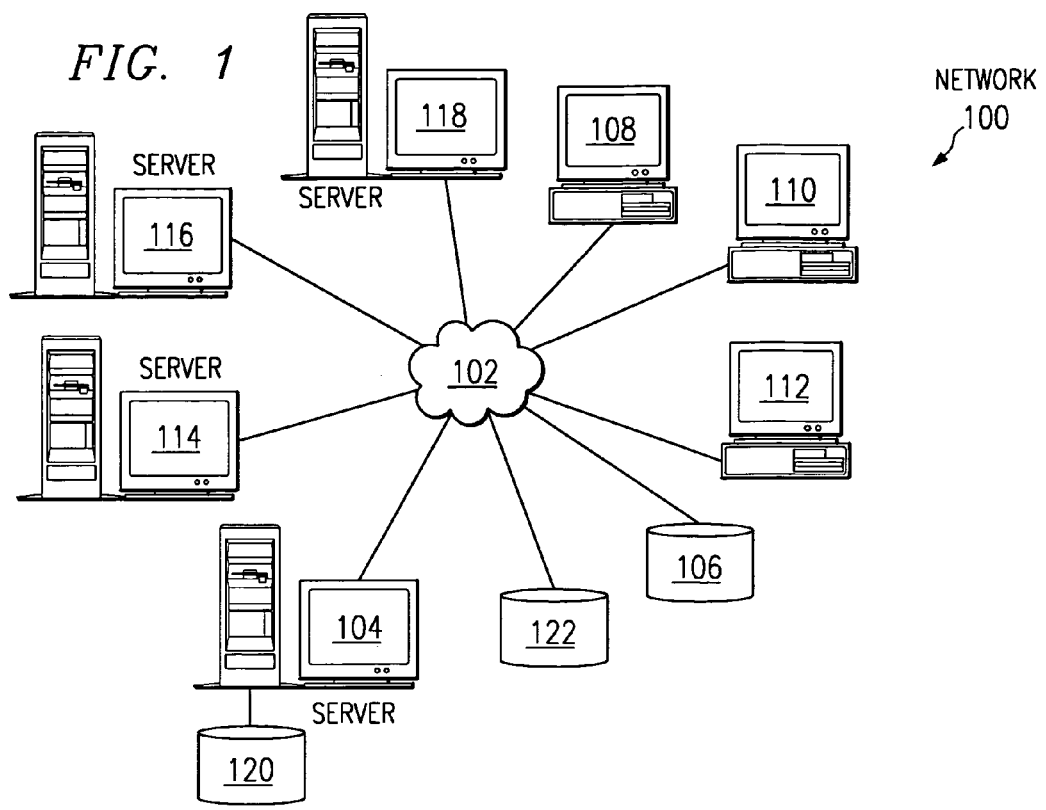
FIG. 1 depicts an exemplary distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 114, 116 and 118 are connected to network 102. Storage units 106 and 122 are also connected to network 102, providing backup support for any or all of servers 104, 114, 116 and 118. Storage unit 122 provides dedicated backup support for server 104. In addition, clients 108, 110 and 112 are also connected to network 102. These three clients may be, for example, personal computers or network computers. For purposes of this application, a network computer is any computer coupled to a network, which receives a program or other application from another computer coupled to the network.

Distributed data processing system 100 may include additional servers, clients, and other devices not shown.

In the depicted example, servers 104, 114, 116 and 118 provide storage for data from clients 108, 110 and 112. These four servers also provide data, such as boot files, operating system images, and applications to clients 108, 110 and 112. Clients 108, 110 and 112 are clients to one or all of servers 104, 114, 116 and 118. Support for a particular application being performed on one of clients 108, 110 and 112 may be by one of servers 104, 114, 116 and 118. Additionally servers 104, 114, 116 and 118 may provide backup support for each other. In the event of a server failure, a redundant backup server may be allocated by the network administrator, in which case requests directed to the failed server are routed to the redundant backup server.

In a similar manner, data backup support is provided by storage units 106 and 122 for servers 104, 114, 116 and 118. However, rather than the network administrator allocating a data backup storage unit at each use, data backup allocation is set, and data backup transfer occurs at low usage times, typically after midnight, between any of servers 104, 114, 116 and 118 and storage units 106 and 122.

Encryption of sensitive data is vitally important for widespread acceptance of networked computers to perform everyday functions, particularly in the business and government sectors. For example, a user of client device 108 may decide to purchase a product sold by vendor 104. Clearly, credit card numbers and other items associated with the purchase need to be encrypted. In the depicted example, distributed data processing system 100 may be the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

It is often necessary for a user at one geographic location in a distributed computing environment to take her work, which includes both application programs and data, to a remote location. This is often accomplished by using removable media, such as a zip drive, tape drive or a removable hard drive. Traditional virus scan software examines data by loading it into memory and scanning it. Unfortunately, by that time the virus infection may already have spread. Therefore, the present invention helps prevent the spread of a virus through the use of removable media. FIG. 1 is intended as an example of a distributed environment and not as an architectural limitation for the processes of the present invention. For example, the transfer of applications and data may involve removable media on two machines that are not even connected to the same network, as depicted in FIG. 1.

Figure 2:
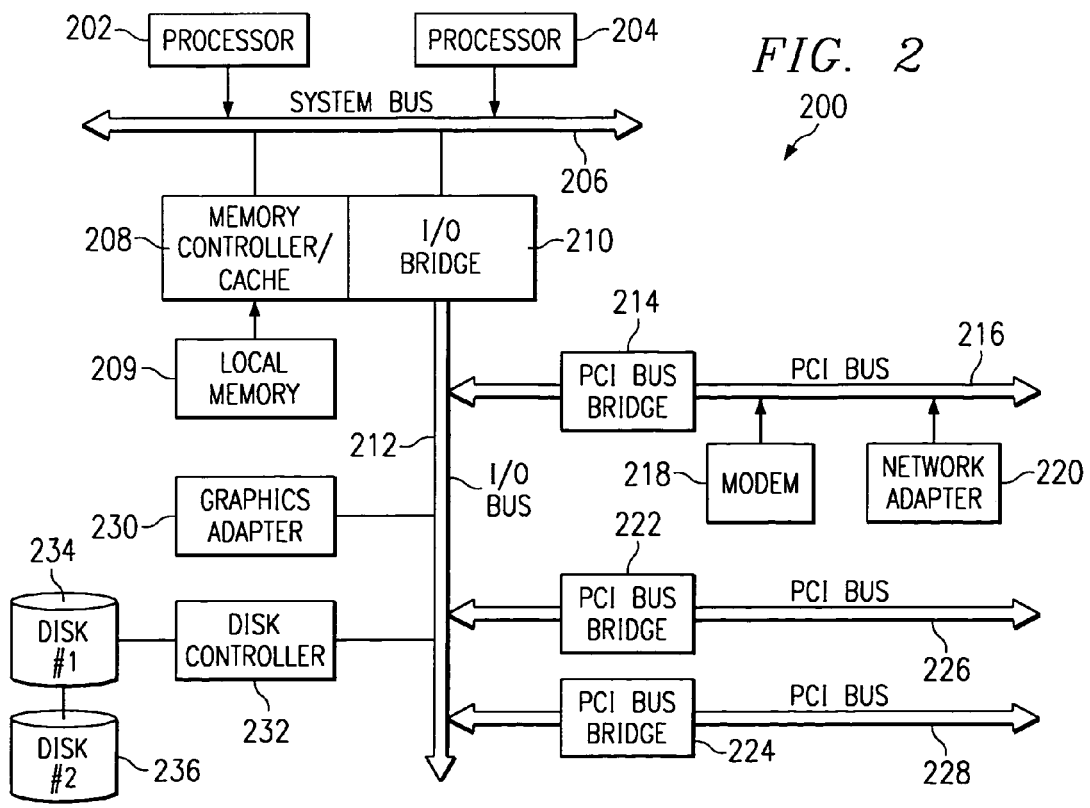
FIG. 2 shows an exemplary block diagram of a data processing system which may be used as a server or client in which the present invention may be implemented.

FIG. 2 is a block diagram of a data processing system which may be implemented as a server or client, such as server 104 or client 108 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A modem 218 and a network adapter 220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and disk controller 232 may also be connected to I/O bus 212 as depicted, either directly or indirectly. Disk controller 232 has two disks connected, 234 and 236. One or both of these may be removable hard disks, zip drives, tape drives, or other removable media. The present invention might be implemented as part of disk controller 232, as shown below in FIG. 3A. Alternatively, the present invention may be on a separate controller card, as shown in FIG. 3B, connected to I/O Bus 212.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3A:
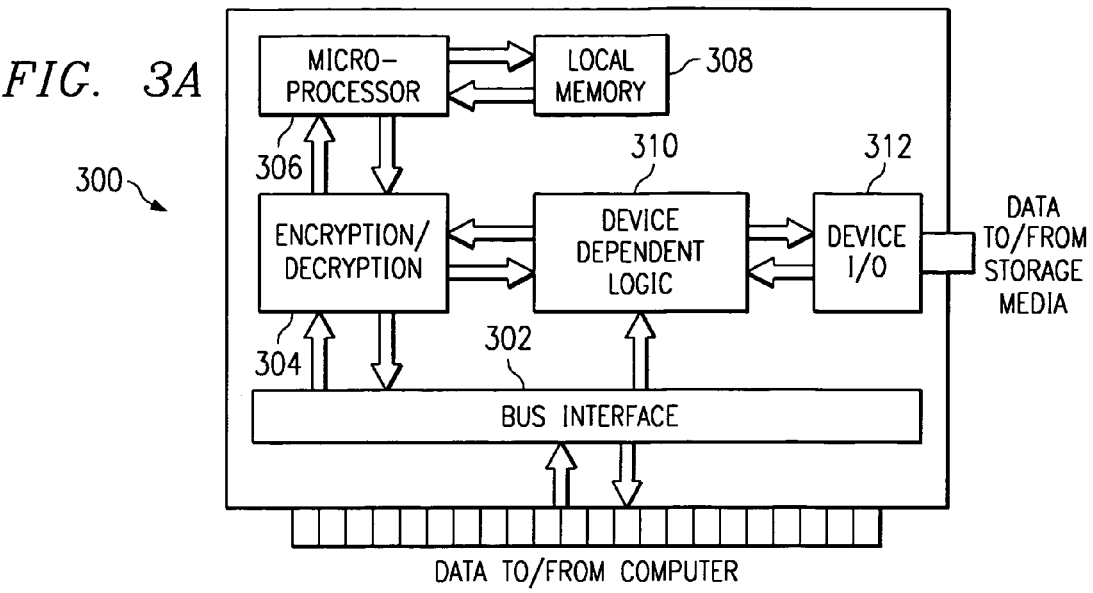
FIG. 3A presents an exemplary block diagram for a device controller with security logic in accordance with a preferred embodiment of the invention.
Figure 3B:
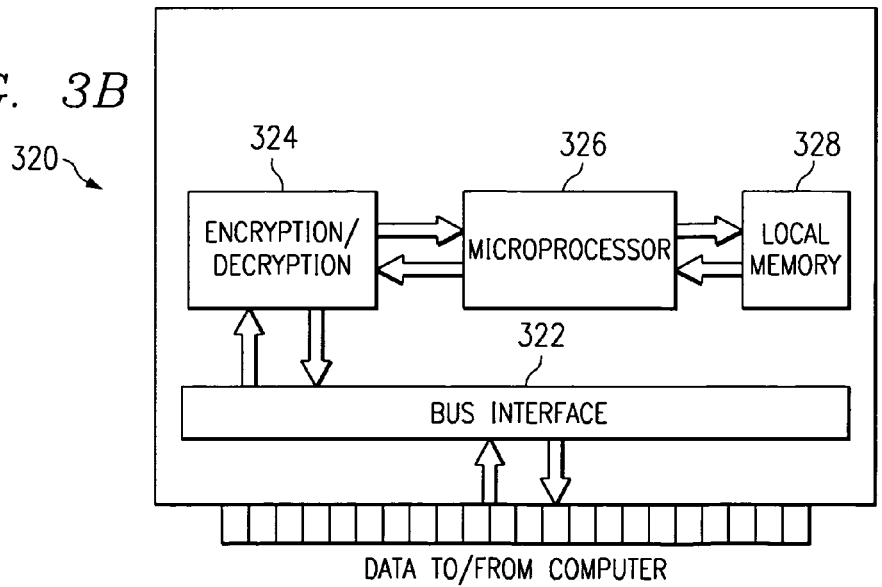
FIG. 3B presents an exemplary block diagram for a stand alone security logic card in accordance with a preferred embodiment of the invention.

Referring now to FIG. 3A, a block diagram for a device controller for removable media is shown. This card, as shown, plugs into the data processing system bus and data is transferred using bus interface 302. PCI (Peripheral Component Interconnect) is a peripheral bus commonly used in PCs, Macintoshes and workstations. However, as one of ordinary skill in the art will appreciate, other bus structures, such as PC Card bus, NuBus, micro channel, VMEbus, and MULTIBUS, are possible. The bus provides a mechanism to move data between the computer memory and the device controller card. The most commonly used techniques are direct memory access, I/O transfer, and shared memory.

Every device controller for a removable media contains hardware specific to the particular device in the form of Device Dependent Logic 310. The controller card must connect to the device itself and this task is performed by Device I/O 312. As one of ordinary skill in the art will appreciate, there are a variety of removable media, such as removable hard drives, zip drives, tape drives, removable optical media such as CD-R or CD-RW or DVD-ROM, and floppy drives.

If data is being received from the device, it has to be transferred to the computer memory. Before this transfer is made, the data is checked for possible infection. Encryption/decryption logic 304, in conjunction with microprocessor 306 and local memory 308, uses a security key to decrypt the data, re-encrypt the decrypted data, and compare the resultant data with the original data. If the comparison shows the data is the same, it is sent to the computer memory via Bus Interface 302. If the data is not the same, it is rejected and the operating system is notified the transfer was unsuccessful.

Typically a single error of this type would indicate an infected media and all data transfers from the media would be rejected, even if some blocks of data decrypt and re-encrypt properly. This checking is performed by dedicated hardware, therefore it can be performed in real time. Unlike software-based approaches that are much slower, the data can be verified as uncorrupted and passed on to the computer system for further processing at the same rate that it is received.

A key idea of the present invention is that a private security key is known to perform the decryption/re-encryption step and this key is retrieved from the removable media itself. The decryption/encryption logic may contain a variety of commonly used encryption algorithms, such as DES (Data Encryption Standard). If the security key itself was infected, then the decryption/re-encryption would fail.

As one of ordinary skill in the art will appreciate, although the logic to perform the decryption and re-encryption is shown on Controller Card 300 in FIG. 3A, this logic could be located anywhere in the data stream between the device controller and the computer memory. In FIG. 3B, this logic is shown on an auxiliary card, such as a second PC Card in a laptop computer. Data is sent from the device controller to the system bus where it is received on security card 320 via bus interface 322. It is assumed the security key has been read off the removable media and already sent to security card 320. The data is decrypted and then re-encrypted using Encryption/Decryption logic 324 in conjunction with microprocessor 326 and local memory 328. If the resultant data is the same as the original data, then the original data is sent to the computer memory via bus interface 322. If the data does not match, then a control signal is sent back to the device controller for the removable media to abort transfer of any additional data. As one of ordinary skill in the art will appreciate, although the logical hardware shown in FIG. 3B is on a separate security card that plugs into a system bus, this hardware could be located on a mother board or other location provided it could intercept and analyze the data being sent from the device controller to the computer memory.

Figure 4:
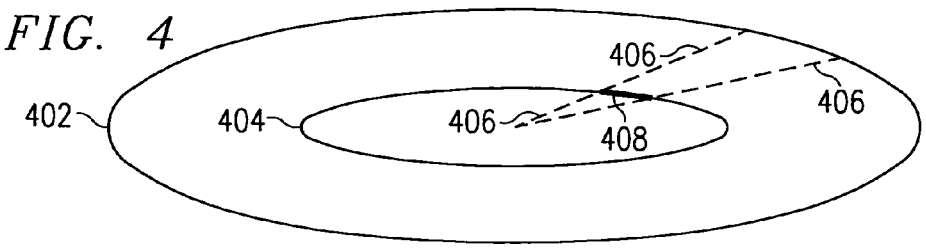
FIG. 4 presents a diagram showing data storage on a removable media.

With reference now to FIG. 4, a diagram showing data storage on a removable media where the present invention may be implemented. A top surface on a single platter of a disk is shown where the disk 402 rotates about a center point. Data is stored in tracks, which form concentric circles about the center. Track 404 is illustrative of a typical track. Pie shape segments divide the track into separate sectors. In this case segment 406 forms sector 408 on track 404. A disk head is positioned over the track and the disk rotates beneath the disk head until the desired sector passes underneath the head and the data is transferred from the removable media to the device controller, such as controller 300 in FIG. 3A. A sector of data is the smallest unit of data transferred to or from the removable media to the device controller.

As one of ordinary skill in the art will appreciate, a single platter may use both the top and bottom surfaces of the platter and multiple platters may be connected to the same rotating mechanism. A disk head is needed to read or write to each surface. In the case of multiple surfaces, the tracks with the same distance from the center form a cylinder and the logical organization of data may be over a cylinder since the disk heads do not have to move within the same cylinder. Regardless of the actual removable media, be it a hard drive or a floppy drive, the smallest unit of data transferred from the media to the controller card is the sector of data.

Figure 5:
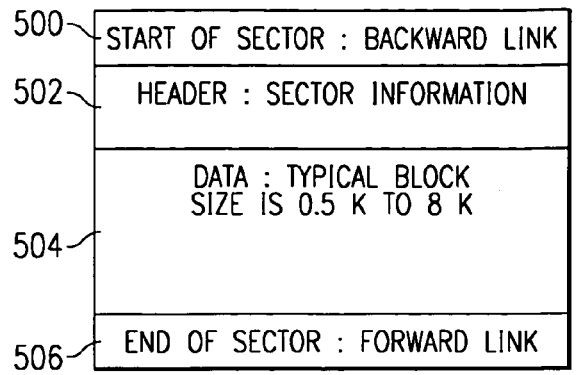
FIG. 5 shows the exemplary contents of a single sector of data from a removable media.

FIG. 5 shows the exemplary contents of a single sector of data from a removable media. In this particular example, it is assumed the sectors are logically linked together to form a logical structure, such as a file, even though these sectors may not be contiguous on the removable media. Therefore, there is backward link 500 at the start of the sector and forward link 506 at the end of the sector. Header section 502 contains additional sector information, such as the sector number. Data 504 in the sector will vary is size depending on the media. A floppy disk may have sectors as small as 0.5 Kb and a hard disk may have sectors with several Kb of data. It is the data section of the sector that is encrypted with a security key. Furthermore, it is assumed the device controller has been programmed to fetch the security key from the removable media itself.

Figure 6:
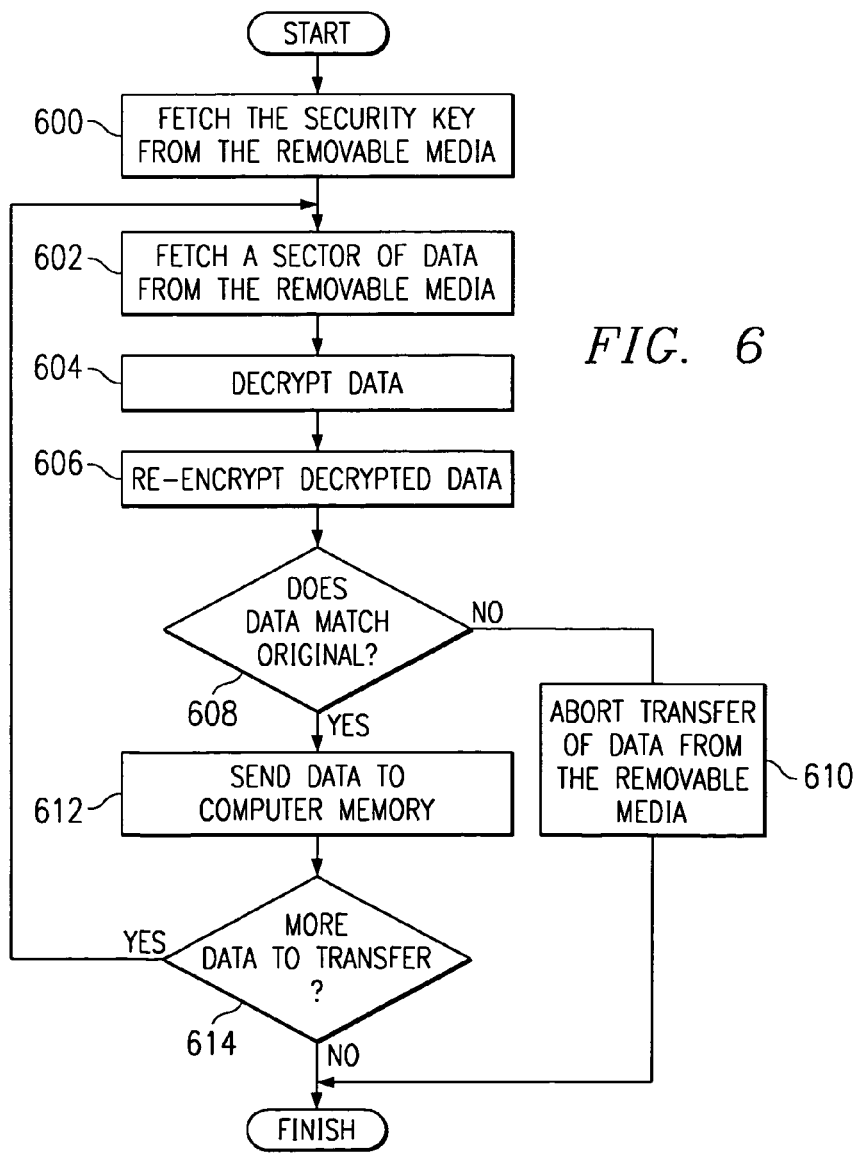
FIG. 6 presents an exemplary flowchart showing the decryption/encryption of data transferred from a removable media in accordance with a preferred embodiment of the invention.

With reference to FIG. 6, an exemplary flowchart shows the decryption/encryption of data fetched from removable media in accordance with a preferred embodiment of the invention. First, the security key is fetched from the removable media (step 600). Then a sector of data is fetched from the removable media (step 602). The data is decrypted using the security key (step 604) and then re-encrypted again (step 606). The original data has been retained in memory and now is compared with the new data produced by the decryption/re-encryption process. If the data does not match (step 608: No), the transfer from the removable media is aborted and the operating system is notified that the media is unreliable (step 610).

If the data does match (step 608: Yes), the data is accepted and sent to the computer memory (step 612). If there is more data to be transferred (step 614: Yes), then control transfers back to get the next sector (step 602). If the transfer from the removable media is complete (step 614: No), then the operation is finished.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best-explain the principles of the invention and the practical application, and to enable others of ordinary skill in the art to understand the invention for various embodiments with various modifications as are suited to the particular use contemplated.

What is claimed:

1. A method in a data processing system for implementing security for a removable media, said system including a device controller within said system, said system reading data from and writing data to said removable media when said removable media is removably coupled to said controller, the method comprising the steps of:

temporarily coupling said removable media to said controller;

retrieving, by said system, a security key from the removable media, said security key being exported out from said removable media and into said system;

reading an encrypted block of data, that is intended to be stored in storage in said system, from the removable media and into said system;

prior to said encrypted block of data being received by said storage within said system:
  decrypting the encrypted data using the security key, and
  re-encrypting the decrypted data using the security key to produce a new data; and forwarding, to said storage within said data processing system, the original encrypted data if the original data and the new data are identical, said original encrypted data being received by said storage only after a determination is made that said original data and said new data are identical.

2. The method of claim 1, wherein hardware to perform decryption, re-encryption, and message comparison is on said controller.

3. The method of claim 1, wherein hardware to perform decryption, re-encryption, and message comparison is on a separate security card.

4. The method of claim 1, wherein hardware to perform decryption, re-encryption, and message comparison is on a data path from said controller and said storage.

5. The method of claim 1, wherein the decryption, re-encryption, and comparison of the data is performed in real time.

6. The method of claim 1, further comprising the step of if the encrypted data and the new data are not identical, aborting reading from the removable media and sending an error signal to an operating system.

7. An apparatus in a data processing system for implementing security for a removable media, said system including a device controller within said system, said system reading data from and writing data to said removable media when said removable media is removably coupled to said controller, the apparatus comprising:

said removable media temporarily coupled to said controller;

a security means in said data processing system for retrieving a security key from the removable media, said security key being exported out from said removable media and into said system;

an accessing means for reading an encrypted block of data, that is intended to be stored in storage in said system, from the removable media and into said system;

prior to said encrypted block of data being received by said storage within said system;

an encryption means for decrypting the encrypted data using the security key; and an encryption means for re-encrypting the decrypted data using the security key to produce a new data; and forwarding means for forwarding, to said storage within said data processing system, the original encrypted data if the original data and the new data are identical, said original encrypted data being received by said storage only after a determination is made that said original data and said new data are identical.

8. The apparatus of claim 7 wherein the encryption means is implemented in hardware to perform decryption, re-encryption, and message comparison is on said controller.

9. The apparatus of claim 7 wherein the encryption means is implemented in hardware to perform decryption, re-encryption, and message comparison is on a separate security card.

10. The apparatus of claim 7, wherein the encryption means is implemented in hardware to perform decryption, re-encryption, and message comparison is on a data path from said controller and said storage.

11. The apparatus of claim 7, wherein the decryption, re-encryption, and comparison of the data is performed in real time.

12. The apparatus of claim 7, further comprising if the encrypted data and the new data are not identical, the accessing means stopping reading from the removable media and sending an error signal to an operating system.

13. A computer program product in a data processing system for implementing security for a removable media, said system including a device controller within said system, said system reading data from and writing data to said removable media when said removable media is removably coupled to said controller, the computer program product comprising:

said removable media temporarily coupled to said controller;

instructions for retrieving, by said system, a security key from the removable media, said security key being exported out from said removable media and into said system;

instructions for reading an encrypted block of data, that is intended to be stored in storage if said system, from the removable media, and into said system;

prior to said encrypted block of data being received by said storage within said system;

instructions for decrypting the encrypted data using the security key; and instructions for re-encrypting the decrypted data using the security key to produce a new data; and instructions for forwarding, to said storage within said data processing system, the original encrypted data if the original, data and the new data are identical, said original encrypted data being received by said storage only after a determination is made that said original data and said new data are identical.

14. The computer program product of claim 13, wherein instructions to perform decryption, re-encryption, and message comparison are implemented in hardware on said controller.

15. The computer program product of claim 13, wherein instructions to perform decryption, re-encryption, and message comparison are implemented in hardware on a separate security card.

16. The computer program product of claim 13, wherein instructions to perform decryption, re-encryption, and message comparison are implemented in hardware on a data path from said controller and said storage.

17. The computer program product of claim 13, wherein instructions for decryption, re-encryption, and comparison of the data are performed in real time.

18. The computer program product of claim 13, further comprising if the encrypted data and the new data are not identical, instructions for aborting reading from the removable media and sending an error signal to an operating system.

* * * * *

UNITED STATES PATENT AND TRADEMARK OFFICE
CERTIFICATE OF CORRECTION

PATENT NO. : 6,944,769 B1  Page 1 of 1
APPLICATION NO. : 09/637320
DATED : September 13, 2005
INVENTOR(S) : Daniels et al.

It is certified that error appears in the above-identified patent and that said Letters Patent is hereby corrected as shown below:

Col. 7, line 38: after "the new data" delete "arc" and insert --are--.

Col. 8, line 19: after "in storage" delete "if" and insert --in--.

Col. 8, line 29: after "original" delete " , ".

Signed and Sealed this

Twenty-second Day of August, 2006

JON W. DUDAS
*Director of the United States Patent and Trademark Office*